United States Patent [19]

Larish

[11] Patent Number: 4,835,563
[45] Date of Patent: * May 30, 1989

[54] ELECTRONIC RECORDING CAMERA WITH FRONT PROJECTOR

[75] Inventor: John J. Larish, Fairport, N.Y.

[73] Assignee: AutoStudio Corporation, Fairport, N.Y.

[ * ] Notice: The portion of the term of this patent subsequent to Apr. 19, 2005 has been disclaimed.

[21] Appl. No.: 182,260

[22] Filed: Apr. 15, 1988

Related U.S. Application Data

[63] Continuation-in-part of Ser. No. 933,170, Nov. 21, 1986, Pat. No. 4,738,526.

[51] Int. Cl.$^4$ .................... G03B 7/00; G03B 15/06
[52] U.S. Cl. .................... 354/412; 354/76; 354/290; 354/291; 358/909
[58] Field of Search .............. 354/75, 76, 290, 291, 354/412; 358/75, 76, 209, 226, 906, 909

[56] References Cited

U.S. PATENT DOCUMENTS

| | | | |
|---|---|---|---|
| 3,322,487 | 5/1967 | Renner | 354/291 |
| 3,546,378 | 12/1970 | Karikawa | 354/75 |
| 4,130,834 | 12/1978 | Mender et al. | 358/906 |
| 4,183,644 | 6/1980 | Mureck et al. | 354/291 |
| 4,303,322 | 12/1981 | Someya | 354/432 |
| 4,368,966 | 1/1983 | Hagyuda | 354/131 |
| 4,420,773 | 12/1983 | Toyoda et al. | 358/906 |
| 4,618,239 | 10/1986 | Sakamoto | 354/477 |
| 4,714,962 | 12/1987 | Levine | 358/209 |

Primary Examiner—L. T. Hix
Assistant Examiner—David M. Gray
Attorney, Agent, or Firm—Philip D. Junkins

[57] ABSTRACT

A dual function electronic recording portrait camera that divides the image-forming light reflected from a portrait subject and received through the front lens of the camera into a first optical image portion which passed, upon shutter opening, to a frame of photographic film for recording thereon as a photographic image and into a second optical image portion which is passed to a video charge coupled device with an electronic image array for conversion to an electronic image. The electronic image is viewed before and at the instant of shutter opening through a video display unit associated with the camera and the electronic image is recorded in the memory of a microprocessor associated with the camera at the instant of shutter opening. The recorded electronic image corresponds exactly to the photographic image recorded on film and the electronic image may be recalled from the memory of the microprocessor for video display and review by the camera operator and the portrait subject. Based upon the review of a number of video-displayed, electronically-recorded poses of the portrait subject, selection of one or more preferred poses can be made prior to development of film containing frames of photographic images corresponding exactly to the displayed electronic images.

5 Claims, 2 Drawing Sheets

ELECTRONIC RECORDING CAMERA WITH FRONT PROJECTOR

This is a continuation-in-part of U.S. application. Ser. No. 06/933,170 filed Nov. 21, 1986, now U.S. Pat. No. 4,738,526, granted Apr. 21, 1988

BACKGROUND OF THE INVENTION

Portrait photography, to a significant extent, has depended upon the imagination of the photographer. A creative portrait photographer selects and captures qualities in and features of his or her subject that make the picture artistic rather than common place. Classically, the photographer positions the portrait subject in a multitude of poses and takes one or more proof negative photographs of each pose. Proof prints of each photo are then prepared and submitted to the subject for consideration. In a follow-up visit between the photographer and the portrait subject the proof prints are reviewed and selection is made with respect to one or more of the photos. Finally, the portrait subject receives finished prints and/or enlargements of the selected photo or photos. The entire portrait photography process is time consuming for both the photographer and the subject and, if a first set of proof prints does not yield an acceptable photo, the process of photography and preparation of proof prints must be repeated.

It is an object of the present invention to provide an improved system for accomplishing high quality portrait photography over a relatively short time period including a single photographer-subject photography session with final photo selection by the portrait subject.

It is a further object of the invention to provide an improved automated system for accomplishing high quality portrait photography during a single photographer-subject session including in-session selection of one or more photos by the portrait subject for finishing as photo prints and/or enlargements.

It is a still further object of the invention to provide an improved automated system for high quality portrait photography which permits subject photographing, photo pose selection and final print and/or enlargement within a period of approximately one hour.

It is yet another object of the invention to provide a unique method for accomplishing high quality portrait photography during a one-hour session in a photography studio including subject multiple frame photographing, photo pose comparison and selection and final print and/or enlargement production and delivery.

Other objects and advantages of the invention will be apparent from the following summary and detailed description of the invention, taken with the accompanying drawing.

SUMMARY OF THE INVENTION

The present invention relates to a method and system (including a unique arrangement of computer and photographic apparatus) for automated or computer-aided portrait photography. The method and system utilize a fully automatic, between-the-lens 35mm automatic camera including latest auto-wind, auto focus and auto-exposure features. A beam splitter behind the camera lens captures a part of the image-forming light reflected from the portrait subject to provide a video pickup charge coupled device (CCD) with an exact color video image of the subject as seen by the camera. On the outside of the camera housing a flat screen video viewfinder is provided which permits the operator (portrait photographer) to view the image which is being received by the video pickup device. The camera and overall system components are interfaced with and connected to a microprocessor and are controlled by the flash circuitry of the camera. When the operator is satisfied with the subject's appearance and pose (as seen through the video viewfinder), press-button action trips the camera shutter for exposure of a frame of film, actuates the flash circuitry of the camera firing flash lighting apparatus and directs (through the microprocessor) the electronic storage (via solid state memory) of a video image identical to the image captured by the camera film.

In accordance with the unique system of the invention, the stored video image can be outputed (by wireless transmission means) to a video portrait viewer (CRT screen) for subject viewing. The video portrait viewer can also be utilized as a means for displaying to the portrait subjects (particularly children) attention-getting images (static or live) of animals, toys, etc. during the pose preparation periods of portrait photographic sessions. In addition, the portrait viewer (via microprocessor direction) can be utilized to display a multiplicity of the captured (stored) video images (each representing a film frame) for subject comparison and selection. Thus, immediately following the taking of a number of portrait photographs, the entire group of stored video images can be displayed in sub-groups (2, 4, 6, etc. images), manipulated for side-by-side comparison and reduced in preference for final selection. The overall auto-portrait system of the invention may also include a color portrait printer (microprocessor directed) for the production of frame printouts as an aid in the photo proofing and selection process with the protrait subject.

The microprocessor is used to check out and direct all functions of the system including film loading, film advance, flash actuation, auto-focus, and image alignment and selection. With regard to the video portrait viewer and the one or more electronic flash units of the system, the microprocessor directs the wireless transmission of video image information to the viewer and flash actuation and timing information to the flash units.

The camera module also includes a slide projection unit for projecting appropriate background images and/or scenery against a high gain reflection screen positioned as a backdrop behind the portrait subject. In operation, the background images or scenery are projected onto the reflective front-coated surface of a beam slitter located within the camera in front of the camera lens and are thereby front projected to the reflection screen. Image-forming light reflected from the portrait subject and background light reflected from the screen enter the camera through its front opening, pass through the front beam splitter to and through the camera lens, and thereafter pass in part through the behind-the-lens beam splitter to the camera shutter and in part are reflected to the video pickup CCD device. The front projector includes means for bar code reading of slide identification and computer verification information that the slide used for background projection purposes is appropriate in accordance with desired photographic affects, as-well-as, a slide positioner so that the slide is correctly oriented.

The system and methodolgy of the present invention combines the latest automatic 35mm camera technology and microprocessor image information reception, manipulation, storage and regeneration technology for high quality automated or computer-aided, one-session, portrait photography, proofing and product delivery. Development of the portrait film and printing of selected photographic prints and enlargemants is carried out via well known high speed (one-hour or less) developing/printing apparatus and systems. The system also permits automated order processing and billing with printouts, as-well-as film frame and video frame image identification means.

BRIEF DESCRIPTION OF THE DRAWINGS

The foregoing and other objects, features and advantages of the invention will become apparent hereinafter from the following detailed description of the invention taken in conjunction with the accompanying drawings wherein.

DETAILED DESCRIPTION OF THE INVENTION

Figure 1:
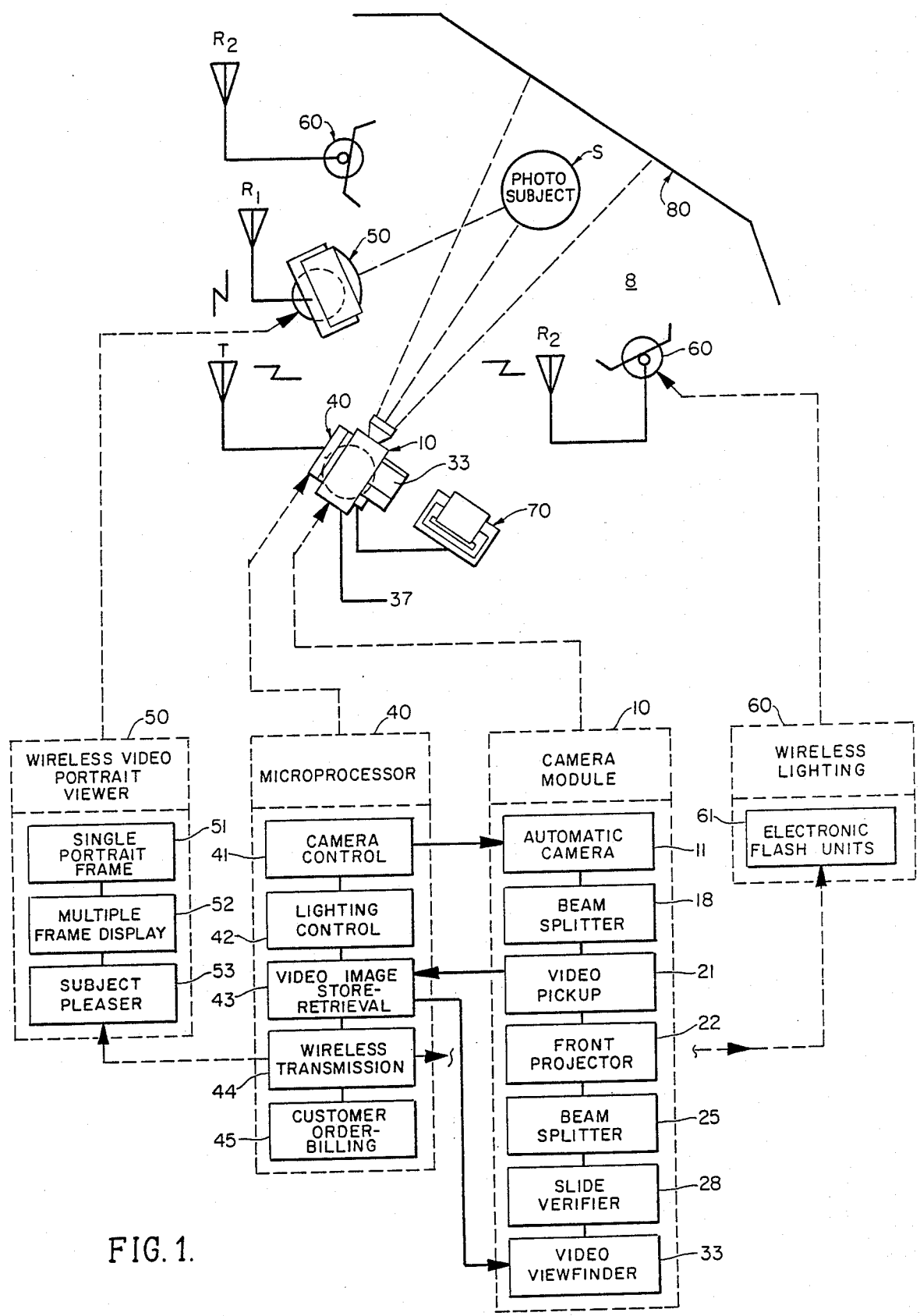
FIG. 1 comprises a top view of the layout of equipment utilized and interacting to accomplish automated portrait photography as a system in accordance with the invention together with block diagramatic presention of the relationships of internal equipment components and functions of the principal items of equipment of the system.

Referring now to the drawings, a preferred embodiment of the invention is illustrated in FIG. 1 and includes a layout of equipment utilized and interacting for automated portrait photography as a system together with a block diagramatic showing of the relationship of the principal equipment modules and their components and functions. Numeral 8 represents in general an auto-portrait studio according to the invention. The studio consists of basic equipment components including: camera module 10, microprocessor 40, wireless video portrait viewer 50, wireless lighting units 60, a computer-directed printer 70 and a high reflection backdrop screen 80. These equipment components, as situated in FIG. 1, are centered about a portrait subject S located in front of reflection screen 80 facing the camera module 10 and in viewing alignment with the video portrait viewer 50. As shown in FIG. 1, the microprocessor 40 is positioned below the camera module 10.

Figure 2:
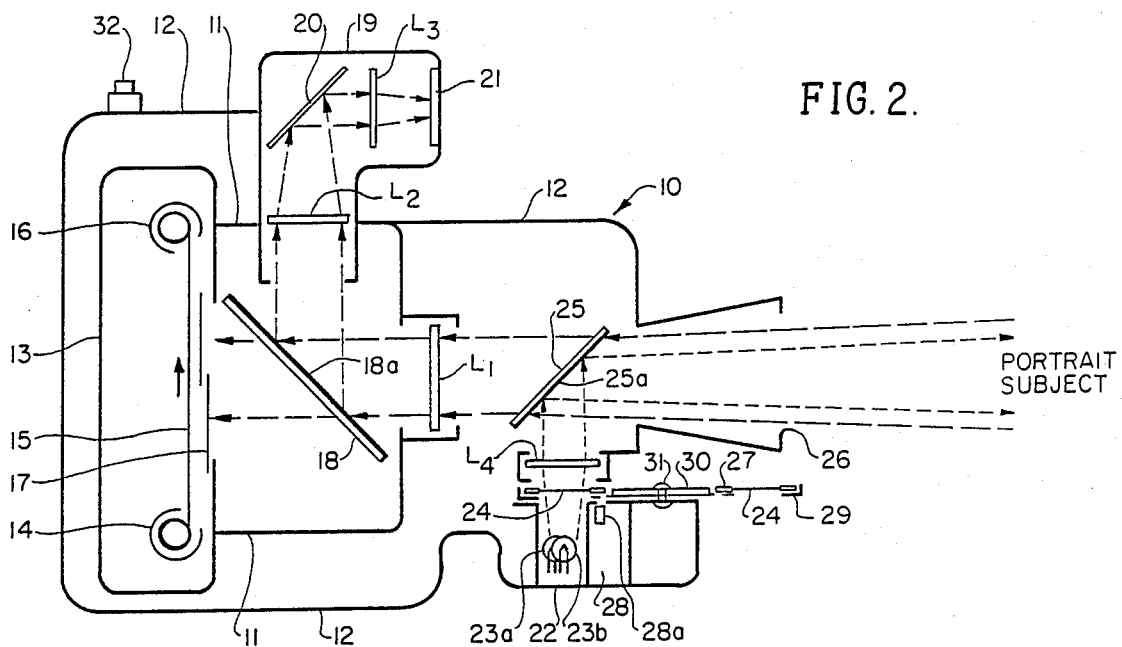
FIG. 2 is a side sectional schematic representation of the camera module utilized inthe automated, computer-aided portrait photographic system of the invention.

The camera module 10 is shown in the side sectional schematic representation of the module in FIG. 2. The camera 11, located within camera module housing 12, is an automatic 35mm long length camera including latest auto-wind, auto-focus and auto-exposure features. The camera also includes as basic components: film compartment 13 including a bulk film delivery cartridge 14, film 15 and a film take-up cartridge 16; shutter mechanism 17; and front camera lens $L_1$. Built into the camera structure (behind the lens $L_1$) is a beam splitter 18 which is essentially a flat glass lens which is silver coated on its front surface 18a. The beam splitter 18 is positioned to receive image-forming light (passing through camera lens $L_1$) and reflect a part of the image-forming light through a fiied lens $L_2$ to a mirror 20 and through relay lens $L_3$ to a video pickup or CCD array device 21. The principal portion of the image-forming light (passing through lens $L_1$) passes through the beam splitter 18 and (upon the opening of shutter 17) is received by film 15 with the image captured thereon by the film's light-sensitive coating.

The camera module 10 is also specially equipped with a built-in front projector 22 which includes a tungsten halide previewing lamp 23a and an electronic discharge flash lamp 23b which fully illuminates a 35mm slide 24 of background or scenery subject matter at the instant of film exposure. The slide subject matter is projected through projector lens $L_4$ to a beam splitter 25 which is silver coated on its front surface 25a. The beam splitter 25 is positioned to receive the background (scenery) image-forming light and reflect same through the front opening 26 of the camera module 10 for projection to the reflection backdrop screen 80 situated behind the portrait subject (see FIG. 1). The background image-forming light is reflected back from the screen 80 to the front opening 26 of the camera module 10 and, together with the image-forming light from the portrait subject S, passes: through the beam splitter 25; to and through camera lens $L_1$; and to and through (in part) the behind-the-lens beam splitter 18. As previously indicated, a part of the image-forming light from the portrait subject and a part of the background (scenery) image-forming light is reflected by beam splitter 18 through field lens $L_2$ to mirror 20 and through relay lens $L_3$ to the video pickup CCD device 21.

Figure 3:
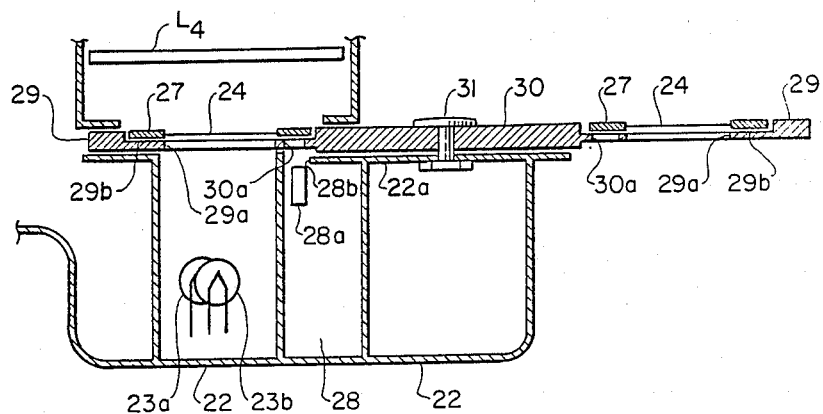
FIG. 3 is an enlarged side sectional view of the front projector portion of the camera module of FIG. 2.
Figure 5:
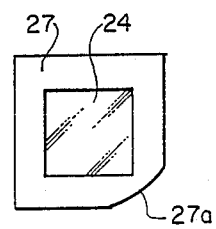
FIG. 5 is a top plan view of a background or scenery slide mount designed for use with the front projector of the camera module in accordance with the invention.
Figure 4:
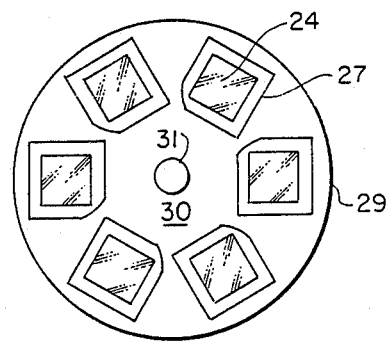
FIG. 4 is a top view of the rotatable slide table of the front projector portion of the camera module.
Figure 6:
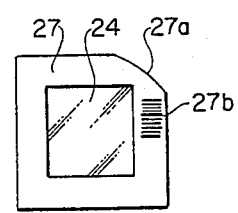
FIG. 6 is an underside view of the background slide mount of FIG. 5.

The front projector 22 is designed to accept only specially prepared slide mounts for the portrait background (scenery) slides. Thus, each slide mount 27 (see FIGS. 5 and 6) for each slide 24 has a single eccentrically rounded corner 27a and a bar code strip 27b on the underside of mount 27 (see FIG. 6). As shown in FIG. 3, the front projector 22 includes a slide verifier section 28 with a built-in bar code reading device 28a for reading the bar code strips 27b on slide mounts 27 through reader port 28b of verifier section 28. A selection of background slides 24 are carried by a rotatable slide table 29 (see FIGS. 3 and 4) which includes a central hub portion 30 around which the slides 24 are positioned over table ports 29a on support ledges 29b which surround the ports 29a. The inner course of each support ledge 29b includes a reader port 30a which, upon rotation of slide table 29 to position a slide over projection lamps 23a and 23b of the projector 22 in alignment with projector lens $L_4$, corresponds with reader port 28b of the slide verifiear section 28 and permits the reading of the bar code strip 27b on the underside of the slide. The rotatable slide table 29 is mounted to the upper wall 22a of the front projector 22 by a pivot connector 31. The rotation of slide table 29 of the front projector may be by hand by the camera operator or may be accomplished by an electrical drive mechanism (not shown) as directed by keyboard instruction of the microprocessor associated with the camera in the auto-portrait system. The focusing of lens $L_4$ of the front projector may also be directed by keyboard and microprocessor control.

The camera module 10 (as shown in FIG. 1) has as part of its structure, on the outside of housing 12, a flat screen video viewfinder 33. Alternatively the viewfinder 33 may be a handheld unit with video screen and limited keyboard interconnected to the camera module and microprocessor by appropriate electric cable or by wireless communication. The video viewfinder 33, under microprocessor control and direction in cooperation with the camera's video pickup CCD device 21, permits the operator (portrait photographer) to see the image of the portrait subject as viewed by the camera 11 prior to the firing of the camera to expose a frame of film. Through the video viewfinder the operator can direct adjustment of the subject's pose position and expression. The camera's internal battery power supply and operating circuitry drive all functions of the camera including the electronic exposure flash unit 23b of the front projector 22. Activation of the camera circuitry functions, along with other functions of the interrelated microprocessor 40, wireless video video portrait viewer 50 and wireless lighting system 60, for accomplishing auto-portrait photography in accordance with the invention, are initiated by push button 32 of the camera module 10.

The microprocessor 40 of the present auto-portrait system may be of any of the well-known commercially available types. It is used in the system, through its interface with the camera module 10, to check and control all camera control functions 41 including film loading and rewind, film advance, electronic flash, front projector operation and auto-focus. The microprocessor 40 also acts and interacts within the auto-portrait system to provide lighting control 42 and to receive the output of the camera's video pickup CCD device 21. Thus, the portrait subject's image a seen by the video pickup device of the camera is relayed to the video viewfinder 33 of the camera for operator viewing and, upon activation of the camera circuitry (shutter opening and film capture of a portrait photograph on film), the subject's portrait video image is captured by the microprocessor's memory store 43. Upon operator direction (through an infrared keyboard arrangement, not show) the portrait video image may be retrieved from the microprocessor's memory store and displayed by wireless (or cable) transmission on the CRT screen of the video portrait viewer 50. Display on the viewer 50 may be as a single full-screen portrait image (viewer funtion 51) or in a multiple display arrangement (viewer function 52) at reduced size along with other portrait images captured during the photographic portrait session for comparison and selection purposes. During multiple display, the several images may be shifted in their display arrangement and reduced in number as the selection process proceeds.

The microprocessor 40 also receives for storage, retrieval and display purposes (under keyboard direction), via the portrait viewer 50, single images or video tape live images and programs for gaining the attention of the protrait subject and for promoting special photographic expressions from children (subject pleaser function 53) during child portrait photography sessions. As previously indicated, the transmission of a single captured video image (function 51), multiple displayed images (function 52) or subject pleaser imagery (function 53) may be by wireless transmission (function 44) under the direction of the operator via the microprocessor. The wireless transmission systems involve the use of a transmitting antenna T associated with the microprocessor and a receiving antenna $R_1$ associated with the video portrait viewer 50. Alternatively, the transmission of imagery may also be conducted by direct cable connection between the microprocessor 40 and the video portrait viewer 50.

Film roll and frame identification date, corresponding video image identification and retrieval information, and customer order processing and billing information (function 45) is also handled by the microprocessor 40 and ordered out or printed out through operator keyboard direction. Thus, video images captured during the photography session can be printed out for comparison and selection purposes via electronic printer 70 and the order processing and billing information is generated by the same printer at the conclusion of the session.

The auto-portrait system of the invention also includes special lighting apparatus 60. The lighting apparatus, as shown in FIG. 1, comprises compact rechargeab;e flash lighting (function 61), fired by remote control through the wireless transmission of light firing signals under microprocessor direction. The subject lighting units 60 have built in spill-control louvers which reduce or eliminate background pickup and assure professional lighting with a minimum of lighting expertise on the part of the operator. Although cable connection between the electronic flash devices 61 and the microprocessor is entirely within the realm of the autoportrait system, wireless control through the mechanism of transmission antenna T and reception antennae $R_2$ at the light stations is preferred so that floor areas between the microprocessor 40 and the lighting units 60 are free of communication cables. The same nonobstruction philosophy applies with respect to communication between the microprocessor and the video portrait viewer 50. As previously indicated, the screen 80, which acts as a backdrop with respect to camera-subject alignment for receiving projected background and scenery, has a high reflection surface. Although the camera module has its own internal power source via batteries (expendable or rechargeable), the microprocessor 40 is provided with its power via power line 37. Where wireless lighting 60 is provided, the electronic flash units 61 included in such lighting are energized by rechargeable batteries.

In operation of the auto-portrait photo studio of the present invention, the portrait subject is positioned appropriatel in alignment with the camera module 10 in front of the reflective background screen 80. Usually the portrait subject will be seated for subject comfort and for ease in promoting appropriate pose orientation and development of a pleasing expression. Through operator (portrait photographer) control the camera module 10 is aligned properly with the portrait subject and determination is made as to the nature of the background scenery to be utilized. Subject alignment of the camera module is accomplished by the operator's viewing of the portrait subject through the video view finder 33 associated with the camera module. The subject's attention is held or attracted to the video portrait viewer 50 in accordance with instructions and imagery or programmed video material generated by the microprocessor 40 by operator command and inputted by keyboard operation.

At the time of operator decision as to desired subject pos and expression, the push-button 32 of the camera is depressed whereby the camera circuitry (in cooperation with the microprocessor): (i) actuates the flash projection of background scenery to background screen 80 by the front projector 22 of the camera; (ii) actuates flash lighting of the portrait subject by electronic flash units 60; (iii) opens the shutter 17 of the camera for the admission of image-forming light from the portrait subject to the light-sensitive surface of a film frame within the camera; and (iv) simultaneously records within the microprocessor's memory a video image of the portrait subject as picked up by the video charged coupled device 21 of the camera in sequence from the behind-the-lens beam splitter 18, field lens L₂, mirror 20 and relay lens L₃. The video image captured by the microprocessor is an exact replica of the photographic image of the portrait subject captured on a frame of the ftured by the microprocessor is an exact replica of the photographic image of the portrait subject captured on a frame of the film within the camera. In accordance with the invention, the captured video image can be retrieved from the microprocessor's memory store for manipulation, display and/or printout as required by the operator and in accordance with the portrait subject's desire. Thus, the entire process of portrait photography, including proof review and selection, can be accomplished in a matter of minutes by the system of the present invention. Coupled with the technology and equipment of fast film development and printing (one hour or less, the entire portrait photography process, as automated by the invention, can be accomplished in an extremely short period of time with delivery of high quality prints and enlargements to the portrait subject in less than several hours from the time of commencement of the portrait photography session.

While the invention has been described in connection with particular structural embodiments of an auto-portrait studio and camera module, variances and modifications in the embodiments will be apparent to those skilled in the art. Accordingly, such modifications are to be included within the spirit and scope of the invention sa defined by the following claims.

What I claim is:

1. In a dual function portrait camera for the concurrent photographic recording of a first portion of the image-forming light reflected to said camera from a portrait subject on photographic film within the camera housing as a photographic image and electronic imaging of a second portion of said image-forming light by video charge coupled device within said housing as an electronic image, said camera comprising:

(a) an automatic camera including a camera housing, photographic film, auto-focus front lens means for receiving image-forming light reflected to said camera from a portrait subject, auto-exposure shutter means behind said front lens means and in front of said film, auto-film-wind means for said film, and electronic circuitry means for operating the automatic functions of said camera;
    (b) light beam splitting means within the camera housing between said front lens means and said shutter means for passing a first portion of the image-forming light received by said front lens means to said shutter means for exposure of a frame of said film upon the opening of said shutter means and thereby recording a photographic image of said subject thereon and for directing a second portion of said image-forming light to the video charge coupled device within said camera housing, said video charge coupled device including an entry field lens for receiving the second portion of said image-forming light from said beam splitting means, a beam folding mirror for redirecting said imageforming light received from said entry lens, a relay lens for receiving said redirected image-forming light, and an electronic image array device for receiving said redirected image-forming light from said relay lens and creating an electronic image of the portrait subject;
    (c) a front projector within the camera housing and arranged to project illustrative matter to a high reflective screen situated behind the portrait subject as background scenic imagery for the portrait photography of the portrait subject, said projector including a focusing lens, light generating means and means for positioning a transparency slide containing said illustrative matter between said lens and the light generating means;
    (d) video display means associated with said automatic camera and interconnected to said charge coupled device as a viewfinder for optically displaying to the camera operator the electronic images directed to said device; and
    (e) microprocessor means in communication with the electronic circuitry means of said camera for controlling the automatic functions thereof and in communication with the video charge coupled device thereof for recording in the memory of said microprocessor means an electronic image of said subject at the instant of exposure of a frame of said film, said recorded electronic image corresponding exactly to the photographic image recorded on said film.

2. In the dual function portrait camera of claim 1 wherein the means for positioning a transparency slide between the focusing lens and the light generating means of the front projector of said camera comprises a rotatable slide table for carrying a multiplicity of transparency slides of differing scenic imagery and for positioning said slides, one-at-a-time, in appropriate alignment for projection of the illustrative matter thereof.

3. In the dual function portrait camera of claim 2 wherein the rotatable slide table of the front projector of said camera includes a multiplicity of slide ports each provided with slide acceptance means for assuring the acceptance of a transparency slide only in its proper orientation for the projection of the illustrative matter of said slide as correctly positioned background imagery, each of said transparency slides having a single eccentrically configured corner for mating with the slide acceptance means of said slide ports.

4. In the dual function portrait camera of claim 1 wherein the front projector of said camera is provided with slide verifier means in communication with the microprocessor means for reading bar code identification indicia on each transparency slide to verify that the illustrative matter of said slide is compatible as background scenic imagery for the portrait photography.

5. In the dual function portrait camera of claim 1 wherein means are provided for interconnecting the microprocessor means of said camera with an electronic printer for printing-out optical images of the portrait subject as viewed by said camera and recorded as electronic images in the memory of said microprocessor means.

* * * * *